US009948681B1

(12) United States Patent
Kruse et al.

(10) Patent No.: US 9,948,681 B1
(45) Date of Patent: Apr. 17, 2018

(54) ACCESS CONTROL MONITORING THROUGH POLICY MANAGEMENT

(71) Applicant: Amazon Technologies, Inc., Seattle, WA (US)

(72) Inventors: William Frederick Hingle Kruse, Seattle, WA (US); Bharath Mukkati Prakash, Bellevue, WA (US); Ashish Rangole, Seattle, WA (US); Nima Sharifi Mehr, Vancouver (CA); Jeffrey John Wierer, Redmond, WA (US); Kunal Chadha, Seattle, WA (US); Chenxi Zhang, Seattle, WA (US); Hardik Nagda, Seattle, WA (US); Kai Zhao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 196 days.

(21) Appl. No.: 15/087,014

(22) Filed: Mar. 31, 2016

(51) Int. Cl.
*H04L 9/00* (2006.01)
*H04L 29/06* (2006.01)

(52) U.S. Cl.
CPC .............. *H04L 63/20* (2013.01); *H04L 63/10* (2013.01)

(58) Field of Classification Search
CPC ..................................................... H04L 63/108
See application file for complete search history.

(56) References Cited

U.S. PATENT DOCUMENTS

| | | | | |
|---|---|---|---|---|
| 6,587,865 B1 | | 7/2003 | Kimbrel et al. | |
| 8,769,604 B2 | * | 7/2014 | Buss | G06F 21/6227 707/705 |
| 8,843,734 B2 | * | 9/2014 | Lim | G06F 21/602 713/150 |
| 8,880,666 B2 | * | 11/2014 | Aaron | H04L 67/1008 709/219 |
| 9,652,432 B2 | | 5/2017 | de Souza et al. | |
| 2003/0149888 A1 | * | 8/2003 | Yadav | H04L 63/1408 726/23 |
| 2003/0154776 A1 | | 8/2003 | Naik | |
| 2008/0028436 A1 | * | 1/2008 | Hannel | H04L 63/0218 726/1 |
| 2008/0178278 A1 | * | 7/2008 | Grinstein | H04L 63/0227 726/12 |
| 2009/0327791 A1 | | 12/2009 | Aerts | |
| 2012/0209998 A1 | | 8/2012 | Svarfvar et al. | |
| 2012/0222002 A1 | | 8/2012 | Harrison | |
| 2013/0160073 A1 | * | 6/2013 | You | H04W 28/18 726/1 |
| 2014/0007184 A1 | * | 1/2014 | Porras | G06F 21/53 726/1 |

(Continued)

*Primary Examiner* — Josnel Jeudy
(74) *Attorney, Agent, or Firm* — Davis Wright Tremaine LLP

(57) ABSTRACT

A computing resource service receives a request to access the service and perform various actions. In response to the request, the computing resource service obtains a set of active policies that are applicable to the request. As a result of the service determining that the set of active policies fail to provide sufficient permissions for fulfillment of the request, the service determines if an enforcement policy is available that is applicable to the request. The service evaluates the request using the enforcement policy such that if the enforcement policy includes permissions sufficient for fulfillment of the request, the request is fulfilled.

20 Claims, 7 Drawing Sheets

600
Receive Request To Perform Action(s) 602
Obtain Policies Applicable To The Request 604
User Authenticated/ Authorized? 606
Yes
Fulfill Request 608
No
Identify Explicitly Denied Permission(s) And Missing Permission(s) 610
Applicable Enforcement Policy? 612
Yes
Apply Enforcement Policy To Request 614
No
Needed Permissions Available? 616
Yes
No
Deny Request 618

(56) References Cited

U.S. PATENT DOCUMENTS

| | | | | |
|---|---|---|---|---|
| 2014/0229739 | A1* | 8/2014 | Roth | G06F 21/6218 713/189 |
| 2015/0229538 | A1* | 8/2015 | Burke | H04L 47/76 709/225 |
| 2016/0036722 | A1 | 2/2016 | Obrecht et al. | |
| 2016/0188377 | A1 | 6/2016 | Thimmappa et al. | |

* cited by examiner

ACCESS CONTROL MONITORING THROUGH POLICY MANAGEMENT

BACKGROUND

Modern computer systems place a high importance on security of user access to computing resources and on maintaining current and accurate polices for the permissions of computer system users to access those computing resources. Resource owners, and other administrators of resources, often use such computing resource policies to control access by computer system users to computing resources in order to support the business needs of the resource owners, administrators, and users. In a computer system where many users may have several assigned roles, permissions, or policies associated with and relating to many different computing resources, maintaining user roles, permissions, or policies can grow increasingly complex, particularly as the size and/or complexity of the system or the number of computer system users increases.

Accordingly, a resource owner may grant access to resources in order to perform one or more actions on behalf of the resource owner while simultaneously ensuring the security of resources. However, determining the level of access to these resources that should be granted to other users can be difficult and pose several problems. For instance, determining what permissions are sufficient to enable users to access these resources can be time and labor intensive. Further, the resource owner can inadvertently provide users with overly-broad access to the computing resources.

BRIEF DESCRIPTION OF THE DRAWINGS

Various techniques will be described with reference to the drawings, in which.

DETAILED DESCRIPTION

Figure 1:
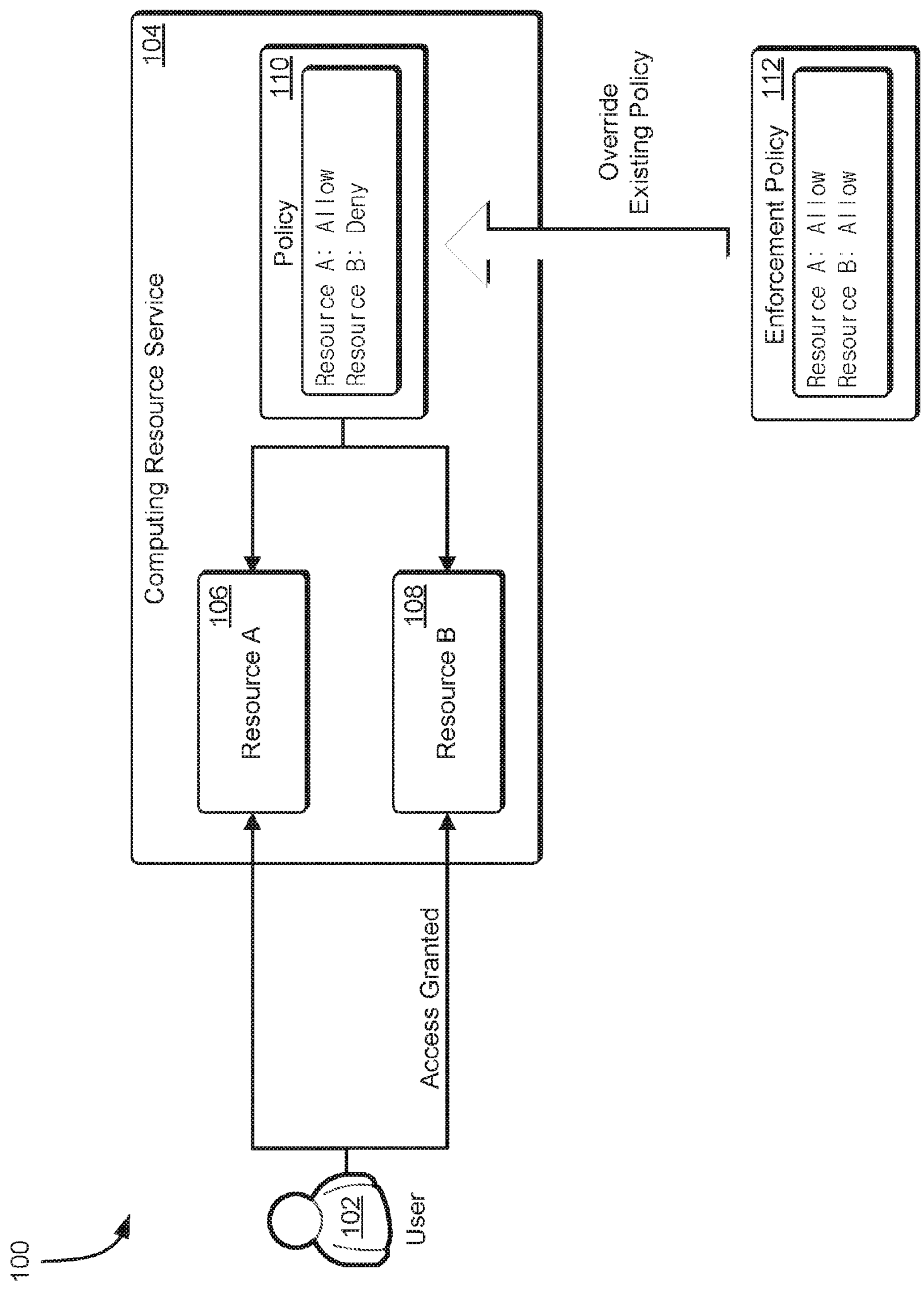
FIG. 1 shows an illustrative example of an environment in which various embodiments can be implemented.

This disclosure relates to the creation and management of enforcement policies that temporarily supersede existing computing resource policies to enable customers to determine access control mechanisms for their computing resources. In one example, a policy management service receives a request to implement an enforcement policy from an administrator of an account, by another computing resource service, or by another entity having the necessary permissions to generate and manage computing resource policies. The enforcement policy may be associated with other computing resource policies, where the enforcement policy and these other computing resource policies may be applicable for certain computing resources, computing resource services, users, customer accounts, and the like. For instance, any number of principals (e.g., users) associated with a computing resource service provider may be associated with this particular enforcement policy and the other associated computing resource policies such that these policies are applicable to the principals.

The enforcement policy may include a variety of permissions that, in response to an incoming request to perform an action on a computing resource of a computing resource service, would enable the computing resource service to fulfill the request by performing the action. For instance, a customer, through the enforcement policy, can specify that any actions requested during a particular period of time are to be permitted, regardless of the permissions specified in other applicable computing resource policies. In some examples, the customer can define a set of permissions that can be used to prevent users from performing certain tasks associated with the target computing resources. For instance, the customer may define a set of permissions that would prevent a user from making a computing resource readable by anyone. Additionally, the customer may define a period of time during which the enforcement policy is active for incoming requests to perform actions on a computing resource. In response to the customer's request to implement the enforcement policy, the policy management service may store the enforcement policy within a policy database, where the enforcement policy may be made available to the applicable computing resource services while the enforcement policy is active.

In an example, in response to receiving a request to perform an action on a computing resource, a computing resource service evaluates the request using the computing resource policies associated with the request. If the user is authorized to perform the action, the computing resource service may fulfill the request. However, if the user is not authorized to perform the requested action based on the computing resource policies associated with the request, the computing resource service may identify any policies that explicitly deny permissions sufficient to enable performance of the requested action and any missing permissions that, if present, would result in the request being fulfilled. Additionally, the computing resource service may determine whether there is an enforcement policy available that is applicable to the request. For instance, if the request was received at a period of time during which the enforcement policy is active, the computing resource service may apply the enforcement policy to the request. Based on the enforcement policy, the computing resource service may determine whether the enforcement policy specifies a set of permissions that, if applied to the request, would authorize the user to perform the action on the computing resource. If, based on the permissions identified in the enforcement policy, the computing resource service determines that the user is authorized to perform the requested action, the computing resource service may fulfill the request. The computing resource service may generate and produce a report specifying what permissions were missing or denied and policy recommendations for enabling users to perform the requested actions.

In this manner, a customer of a computing resource service provider can implement an enforcement policy that can be used to enable users to perform actions on computing resources for a limited time that otherwise would not be permitted to enable customer evaluation of existing computing resource policies. In addition, the techniques described and suggested in this disclosure enable additional technical advantages. For instance, because the computing resource service provides a report indicating any missing permissions or permissions that were denied from the original computing resource policies, the customer may be able to evaluate the report and the actions performed by the users while the enforcement policy was active to determine whether to modify any existing policies to enable improved access to the customer's computing resources. Thus, the customer may identify the permissions necessary for its resources without exposing its computing resources to overly-broad access for an extended period of time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user 102 of a computing resource service 104 transmits a request, such as an application programming interface (API) call, to the computing resource service 104 to access one or more computing resources 106, 108 provided by the computing resource service 104. User access to the one or more computing resources 106, 108 may be subject to a user policy 110, which may be applied to incoming requests from various users, including user 102, for access to a computing resource. The user policy 110 is a collection of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345. Principals may include individual users, accounts, computing resource services, or other principal entities that are allowed or denied access to a computing resource.

Computing resource policies, such as the policy 110 and other active policies may be maintained by a policy management service and may be stored in a policy database, which may be a distributed database in a distributed system with multiple nodes that access the policies. In an embodiment, a customer with privileges for modifying permissions and/or for modifying a set of policies (e.g., an administrator or such other user with privileges for modifying a set of policies, also referred to herein as a "privileged user") of an organization may communicate with the policy management service using one or more application programming interface (API) calls to request creation of policies, editing of policies, or deletion of policies. Such policy modification activities (e.g., creating and editing) may also be referred to herein as "authoring" a policy. The policies may, for example, be utilized to establish, for one or more users, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Computing resource policies 110 may be authored in a default state such as, for example, denying all access or granting all access. Computing resource policies 110 may also be authored based on organizational business needs and/or may be based on roles within that organization so that, for example, all software developers have the same computing resource policy 110. Computing resource policies 110 may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or sub-optimal for some other reason.

In an embodiment, the computing resource service 104, in response to the request from the user 102 to access the one or more computing resources 106, 108 provided by the computing resource service 104, obtains any applicable policies, including policy 110, from the policy management service that may be used to determine whether the user 102 is authorized to access the one or more computing resources 106, 108. For instance, as illustrated in FIG. 1, the user 102 is authorized to access computing resource 106 (e.g., Resource A) but is not authorized to access computing resource 108 (e.g., Resource B) based at least in part on the obtained policy 110. If the computing resource service 104 determines, based at least in part on the obtain policies associated with the request, that the user's request cannot be fulfilled, the computing resource service 104 may identify any permissions missing from the obtained policies that, if they were present, would enable the user 102 to perform the requested actions. Additionally, the computing resource service 104 may identify any of the obtained user policies that explicitly deny permissions sufficient to enable performance of the requested actions. For instance, policy 110 specifies that the user 102 is prohibited performing the requested actions on resource 108 (e.g., "Resource B: Deny"). The computing resource service 104 may generate a report indicating these missing permissions or permissions explicitly denied through the policies identified in response to the user's request to access the one or more computing resources 106, 108. The computing resource service 104 may transmit this report to the policy management service, which may provide the report to a customer or other administrator of the account associated with the one or more computing resources 106, 108. Alternatively, the computing resource service 104 may transmit this report directly to the customer or other administrator of the account.

If the computing resource service 104 determines, based at least in part on the one or more obtained policies, that the user is not authorized to access the one or more computing resources 106,108 or otherwise perform the requested actions, the computing resource service 104 may transmit a request to a run-time service to determine whether there are any enforcement policies 112 that may be applicable to the user's request. An enforcement policy 112 may specify a set of permissions that, if applied to an incoming request, may enable the computing resource service 104 to fulfill the request, regardless of the permissions specified in the other active computing resource policies 110 obtained in response to the request. For instance, as illustrated in FIG. 1, the policy 110 specifies explicitly that the user 102 is not authorized to access resource 108 (e.g., Resource B). The run-time service may provide the computing resource service 104 with an applicable enforcement policy 112 that specifies that the user 102 is authorized to access resource 108. The computing resource service 104 may apply the enforcement policy 112 to the user's request and enable the user 102 to access resource 108. Thus, the enforcement policy 112 may supersede any other applicable policies that may be applied to the incoming request.

In an embodiment, a customer of a computing resource service provider or other administrator of the customer's account can submit a request to a policy management service to generate an enforcement policy that may be applicable to incoming requests to access the one or more computing resources 106, 108 associated with the customer's account. A policy management service may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend (described herein) may receive a request for access to resources and may generate a query to the policy management service based at least in part on information specified by the request.

In some embodiments, the policy management service is a distributed computer system configured to centrally manage policies for multiple services operated by the computing resource service provider. Requests for access to service resources (i.e., requests whose fulfillment involves access to the resources themselves and/or information about the resources) may be evaluated against one or more policies associated with the request and/or associated with the requester and those requests that are allowable based on those polices may be performed. API calls to create, edit, and/or delete policies may also be received by the policy management service. As policies may change, so too may the scope of requests that are allowable change. For example, an organization may have a default policy allowing reads from all storage resources of a certain class. Barring a specific policy restricting a certain user from performing such reads, the default policy would permit such reads by any user. A change to a default policy preventing all reads from that class of storage resource may prevent that certain user from reading from such resources, and may require that specific permissions be granted if that user required that access. Granting such permissions may require that the policy be edited to change the permissions.

Through the policy management service, a customer or other administrator of the customer's account may generate an enforcement policy that is applicable for a limited period of time and that specifies a set of permissions that may supersede existing permissions specified in existing policies applicable to the customer's account. The run-time service may obtain the enforcement policy 112 from the policy management service and determine whether the enforcement policy 112 is applicable to the incoming request from user 102. For instance, the run-time service may determine whether the specified time period during which the enforcement policy 112 is in effect coincides with the time period during which the incoming request was received by the computing resource service 104. If so, the run-time service may provide the enforcement policy 112 to the computing resource service 104 to enable application of the enforcement policy 112.

The computing resource service 104 may evaluate the received request and the enforcement policy 112 to determine whether the enforcement policy 112 has the sufficient permissions to enable the computing resource service 104 to fulfill the request. For instance, if the requested one or more actions are not within the ambit of the set of permissions specified in the enforcement policy 112, the computing resource service 104 may deny the request. However, if the permissions specified within the enforcement policy 112 specify that the user 102 is authorized to perform the requested actions, the computing resource service 104 may fulfill the request. In some embodiments, the computing resource service 104 transmits a report to the policy management service, the customer, or to an administrator of the customer's account. The report may specify the received request, the one or more permissions applied to the request and specified in the original policies, the one or more permissions from the enforcement policy 112 applied to the request, and a determination whether the request was fulfilled or denied.

Figure 2:
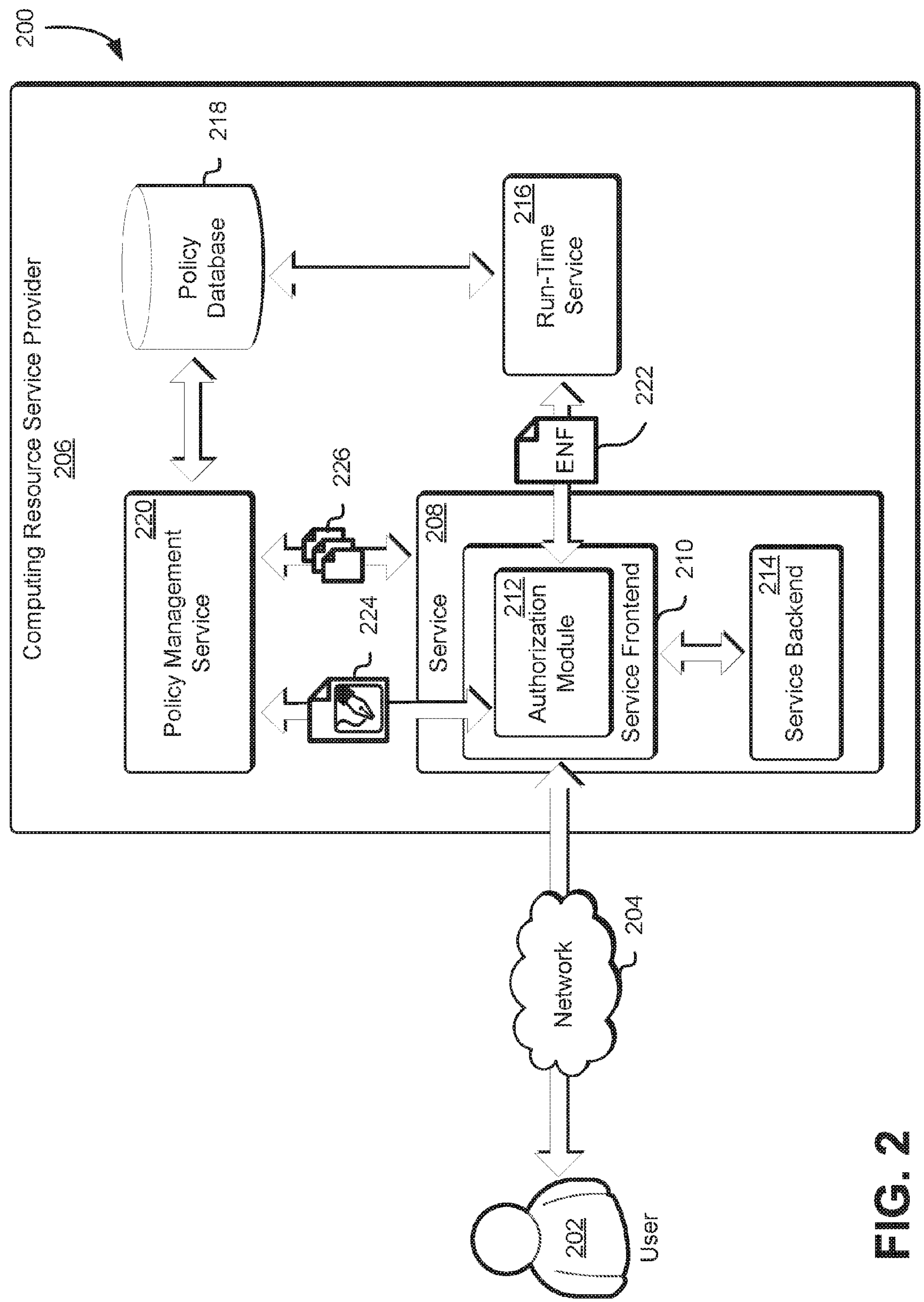
FIG. 2 shows an illustrative example of an environment in which one or more enforcement policies are obtained to enable fulfillment of user requests regardless of permissions specified in other policies in accordance with at least one embodiment.

FIG. 2 shows an illustrative example of an environment 200 in which one or more enforcement policies 226 are obtained to enable fulfillment of user requests regardless of permissions specified in other policies in accordance with at least one embodiment. In an embodiment, a user 202 may use a computing device to communicate over a network 204 with a computing resource service provider 206. Communications between the computing resource service provider 206 and the user 202 may, for instance, be for the purpose of accessing a service 208 operated by the computing resource service provider 206, which may be one of many services operated by the computing resource service provider 206. The service 208 may comprise a service frontend 210 and a service backend 214. The user 202 may issue a request for access to a service 208 (and/or a request for access to resources associated with the service 208) provided by a computing resource service provider 206. The request may be, for instance, a web service application programming interface request. The user may be an individual, or a group of individuals, or a role associated with a group of individuals, or a process representing one or more of these entities that may be running on one or more remote (relative to the computing resource service provider 206) computer systems, or may be some other such computer system entity, individual, or process. Each individual, group, role, or other such collection of users may have a corresponding user definition, group definition, role definition, or other definition that defines the attributes and/or membership of that collection. For example, a group may be a group of users that have the same geographical location. The definition of that group of users may include the membership of the group, the location, and other data and/or metadata associated with that group. As used herein, a user is an entity corresponding to an identity managed by the computing resource service provider, where the computing resource service provider manages permissions for the identity and where the entity may include one or more sub-entities, which themselves may have identities.

The user 202 may communicate with the computing resource service provider 206 via one or more connections (e.g., transmission control protocol (TCP) connections). The user 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 208 may be received by a service frontend 210, which, in some examples, comprises a web server configured to receive such requests and to process them according to one or more policies associated with the service 208. The request for access to the service 208 may be a digitally signed request and, as a result, may be provided with a digital signature. The service frontend 210 may then send the request and the digital signature for verification to a run-time service 216. The run-time service 216 may be a stand-alone service or may be part of a service provider or other entity. The run-time service 216, in an embodiment, is a computer system configured to perform operations involved in authentication of users. In some examples, requests submitted to the service frontend 210 are digitally signed by the user (i.e., by a computing device used by or operating on behalf of the user) using a symmetric cryptographic key that is shared between the user 202 and the run-time service 216. The run-time service 216, therefore, may use a copy of the symmetric cryptographic key to verify digital signatures of requests purported to have been generated by the user 202. However, in other embodiments, the run-time service 216 may be configured to utilize asymmetric cryptography for digital signature verification such as, for example, in response to the user 202 digitally signing requests using a private cryptographic key. In such embodiments, the run-time service 216 may trust a certificate authority that digitally signed a certificate of the user 202 corresponding to the private cryptographic key. Consequently, in some embodiments, the run-time service 216 may use a public cryptographic key specified by the certificate.

If the request is successfully authenticated, the run-time service 216 may then obtain policies applicable to the request. A policy may be applicable to the request by way of being associated with the user 202, a resource to be accessed as part of fulfillment of the request, a group in which the user 202 is a member, a role the user 202 has assumed, and/or otherwise. To obtain policies applicable to the request, the run-time service 216 may transmit a query to a policy database 218 managed by a policy management service 220.

The query to the policy database 218 may be a request comprising information sufficient to determine a set of policies applicable to the request. The query to the policy database may, for instance, include a copy of the request and/or include parameters based at least in part on information in the request, such as information identifying the user 202, the resource, and/or an action (operation to be performed as part of fulfillment of the request). The policy database 218 may be a database or other system operable to process queries. The policy database 218 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the run-time service 216 may provide an authentication response and, if applicable, the obtained policies back to the service frontend 210. The authentication response may indicate whether the response was successfully authenticated. The service frontend 210 may then check whether the fulfillment of the request for access to the service 208 would comply with the obtained policies using an authorization module 212. An authorization module 212 may be a process executing on the service frontend 210 that is operable to compare the request to the one or more permissions in the obtained policies to determine whether the service 208 may satisfy the request (i.e., whether fulfillment of the request is authorized). For example, the authorization module 212 may compare an API call associated with the request against permitted API calls specified by the obtained policies to determine if the request is allowed. If the authorization module 212 is not able to match the request to a permission specified by the policy, the authorization module 212 may generate a report 224 that specifies that the request, based at least in part on the obtained policies, would be denied. In some embodiments, the authorization module 212 generates and specifies, in the report 224, one or more policy recommendations for permissions that may be used to enable fulfillment of the request. The authorization module 212 may provide this report 224 to the policy management service 220.

If the authorization module 212 matches the request to one or more permissions specified by the policy, the authorization module 212 may resolve this by selecting the least restrictive response (as defined by the policy) and by informing the service frontend whether the fulfillment of the request is authorized (i.e., complies with applicable policies) based on that selected response. The authorization module 212 may also select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network. If the fulfillment of the request for access to the service 208 complies with the applicable obtained policies, the service frontend 210 may fulfill the request using the service backend 214. A service backend 214 may be a component of the service 208 configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the user 202.

In an embodiment, if the authorization module 212 is not able to match the request to a permission specified by the policy, the authorization module 212 transmits a request to the run-time service 216 to determine whether there are any enforcement policies 222 available that are applicable to the request. In response to the request, the run-time service 216 may transmit a query to the policy database 218 to obtain any applicable enforcement policies 222. As described above, a customer of the computing resource service provider 206 or other administrator of the customer's account may transmit a request to the policy management service 220 to generate one or more enforcement policies 222 that may be used to indicate that users may access the service 208 and its resources for a period of time subject to a set of permissions. This set of permissions may be more permissive than the permissions defined in the policies stored in the policy database 218 and applicable to user requests. As a result, an enforcement policy 222 may supersede policies that would otherwise be applicable to an incoming request.

The run-time service 216 may provide the one or more enforcement policies 222 obtained from the policy database 218 to the authorization module 212. In response to obtaining the one or more enforcement policies 222 from the run-time service 216, the authorization module 212 may compare the request to the set of permissions in the obtained enforcement policies 222 to determine whether the service 208 may satisfy the request. If, based at least in part on the set of permissions, the authorization module 212 determines that fulfillment of the request is not authorized, the authorization module 212 may cause the service frontend 210 to transmit a response to the user 202 indicating that the request has been denied. Further, the authorization module 212 may generate a report 224 to specify a policy recommendation for permissions that may be implemented to enable fulfillment of the user request. If the authorization module 212 determines that, based at least in part on the set of permissions, that the request is authorized, the authorization module 212 may cause the service frontend 210 to fulfill the request using the service backend 214. Further, the authorization module 212 may generate a report 224 to specify that the request was fulfilled based at least in part on the permissions specified in the enforcement policies 222. The authorization module 212 may further specify, in the report 224, the permissions included in the enforcement policies 222 that enabled fulfillment of the request. These permissions may be used by the authorization module 212 to adopt a policy recommendation to enable the customer to generate one or more policies that, if applied to the request, would cause the request to be fulfilled.

In some embodiments, the policy management service 220 receives from the service 208 one or more data usage logs 226 that can be used to determine whether to generate an enforcement policy 222 applicable to one or more users of the service 208 and to one or more resources provided by the service 208. As users interact with the service 208 and perform various operations, the service 208, through the service backend 214, may generate one or more data usage logs 226. These data usage logs 226 may specify the actions performed by the users of the service 208 over time. Further, the one or more data usage logs 226 may specify authorization decisions made by the authorization module 212 in response to incoming requests from the one or more users. These authorization decisions may specify whether a request was fulfilled or denied, as well as any policies that were applied to the received request.

The policy management service 220 may evaluate the one or more data usage logs 226 to determine whether to generate one or more enforcement policies applicable to future requests from the one or more users of the service 208. For instance, if the policy management service 220 determines, based at least in part on the received data usage logs 226, that users are submitting requests to access a particular resource provided by the service 208 and these requests are being denied, the policy management service 220 may generate an enforcement policy 222 that may be used to enable these users to access the particular resource for a limited time. This may enable the policy management service 220 to monitor user access to this resource and provide reports 224 to an administrator of the service 208 regarding the application of the enforcement policy 222. Thus, the administrator 208 may utilize the information from the policy management service 220 to determine whether to generate a new policy or otherwise modify existing policies based at least in part on application of the enforcement policy 222.

In some embodiments, the policy management service 220 implements an enforcement policy 222 for a new user of the service 208 based at least in part on the policies defined for the new user and the policies applied to other similar users of the service 208. For instance, the policy management service 220 may evaluate the data usage logs 226 from the service 208 and the profiles of the new user and other users that have accessed the service 208, to determine whether the new user is part of a user group with other users of the service 208. For example, the user profiles for the new user and other users of the service 208 may specify an organization, working group, or other association to which the new user and these other users may belong to. Based at least in part on the data usage logs 226, the policy management service 220 may determine whether there are any policies applicable to the new user that differ from the policies that are applicable to other members of the same group to which the new user belongs. If there are any differing policies, which may be resulting in the new user being unable to access the service 208 or resources provided by the service 208, the policy management service 220 may generate an enforcement policy 222 that may be applicable to requests submitted by the new user to the service 208. Thus, the policy management service 220 may evaluate the new user's interactions with the service 208 through application of the enforcement policy 222 and prepare one or more recommendations for the administrator of the service 208 or the working group.

Figure 3:
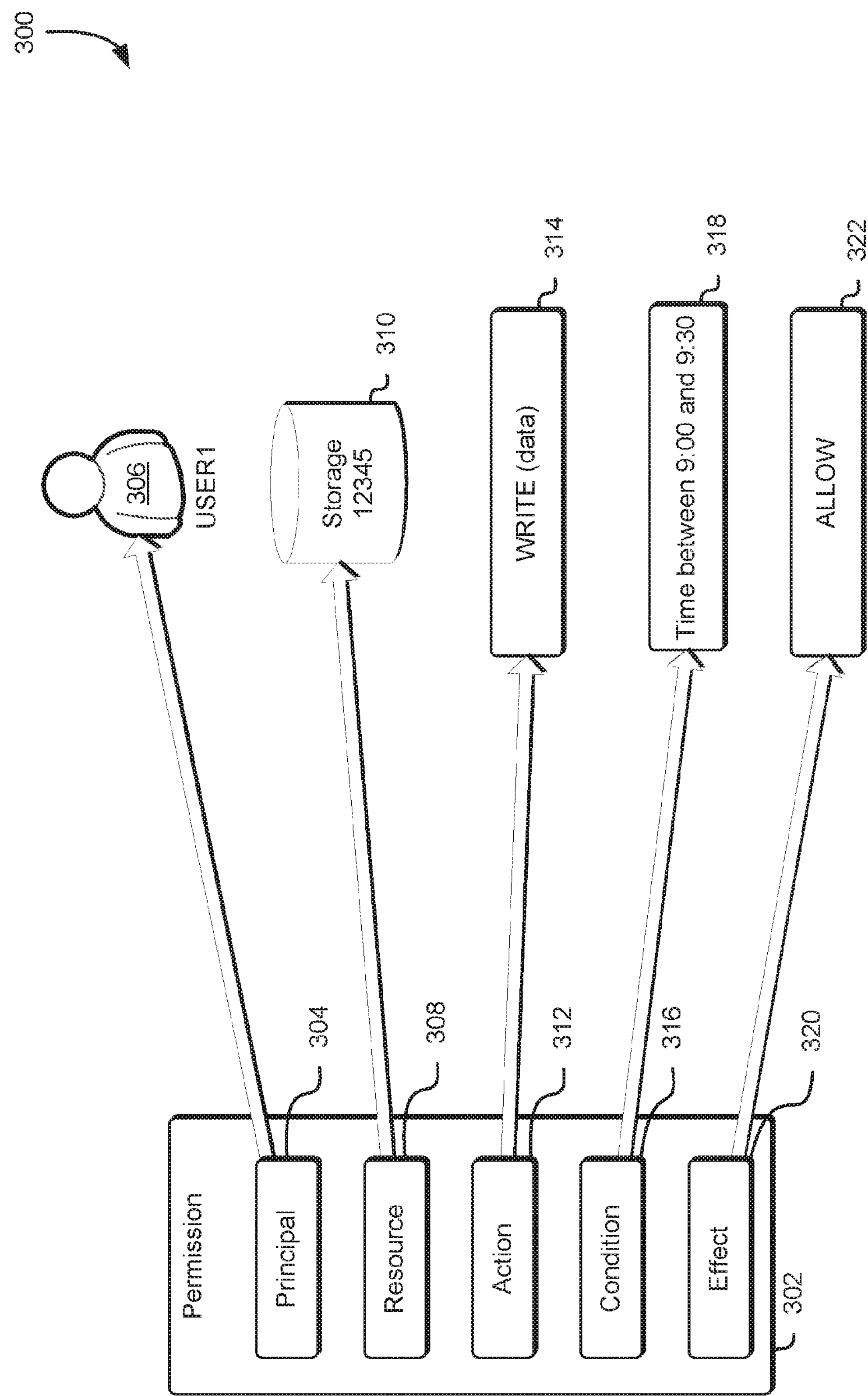
FIG. 3 shows an illustrative example diagram in which a permission associated with a computing resource policy is illustrated in accordance with at least one embodiment.

FIG. 3 shows an illustrative example of a diagram 300 in which a permission associated with a computing resource policy is illustrated in accordance with at least one embodiment. In an embodiment, a permission 302 may specify a principal 304, a resource 308, an action 312, a condition 316, and an effect 320. In some embodiments, a permission may also specify a plurality of one or more of these elements such as, for example, a set or class of users, a collection of resources, several different actions, and/or multiple conditions. In some embodiments, the permission 302 may specify one or more wildcards or otherwise modifiable characters that may be used to denote that the permission 302 may be modified to make the permission 302 applicable to different users and their associated resources.

The principal 304 may be a user, a group, an organization, a role, or a collection and/or combination of these or other such entities. A principal 304 may be any entity that is capable of submitting API calls that cause an action associated with a resource to be performed and/or any entity to which permissions associated with a resource may be granted. In the example permission 302 illustrated in FIG. 3, the principal 304 is a user 306 identified as "USER1." The action 312 may be any action that may be performed in association with the resource and may, for example, be identified by a type of API call, a library call, a program, process, series of steps, a workflow, or some other such action. For example, an action may be a set of operations that may be performed as part of the fulfillment of an API call to, for example, a web service. The actions that are performed may be a subset of those actions and/or may be a single operation. The operations may also be performed in a defined order, may be repeated, or may be shared between a plurality of API calls. In the example permission 302 illustrated in FIG. 3, the action is an API call to write data to the resource. The permission 302 illustrated in FIG. 3 may be one of a plurality of permissions specified by user policy permissions. The example permission 302 illustrated in FIG. 3 further specifies a storage resource 310 for the resource 308, a data write API call 314 for the action 312, a time condition 318 for the condition 316, and an ALLOW effect 322 for the effect 320. The example permission thus specifies that "USER1 is ALLOWED to WRITE to 12345 between 9:00 AND 9:30 AM."

In an embodiment, an enforcement policy includes a set of permissions that can either supersede a computing resource policy that explicitly deny the necessary permissions or introduce permissions otherwise missing from the computing resource policy. For instance, the set of permissions specified in the enforcement policy may specify one or more wildcards or otherwise modifiable characters that may be used to denote that the set of permissions may be modified to make these permissions applicable to different users and their associated resources. This may be in contrast to other active computing resource policies, whereby the principal 304, resource 308, action 312, and effect 320 are narrowly defined. For instance, a computing resource policy permission may specify that "USER1 is ALLOWED to WRITE to 12345." The set of permissions specified in the enforcement policy may specify that any user is allowed to perform read and write operations to various resources associated with a particular computing resource service. This set of permissions may thus be broader than the permissions specified in other active computing resource policies. A computing resource service may apply the enforcement policy in a manner that supersedes any existing active computing resource policies that may be applicable to the incoming request.

The set of permissions that are specified in the enforcement policy may also specify a particular time condition for condition 316 that differs from the other policies. For instance, if a customer or other administrator of the customer's account specifies that an enforcement policy is to be applied only during a particular time period, the policy management service may define, for each permission specified in the enforcement policy, a condition that includes a time condition that corresponds to the time period defined by the customer or other administrator. Alternatively, the policy management service may update metadata associated with the enforcement policy to indicate the time period during which the enforcement policy is active. Thus, a run-time service submitting a query to the policy database to obtain any enforcement policies applicable to the request may determine, from this metadata, whether an enforcement policy is in effect for a particular computing resource service, a set of resources, and the like.

In some embodiments, the condition 316 can specify a maximum number of requests to which the enforcement policy can be applied. For instance, as the enforcement policy is applied to incoming requests from various users, the policy database may update metadata associated with the enforcement policy to specify the number of remaining requests to which the enforcement policy may be applied. Thus, if the enforcement policy has been applied to the maximum number of incoming requests, the run-time service may be unable to obtain the enforcement policy for subsequent requests, as a query to the policy database may result in a determination that the enforcement policy has expired.

In another embodiment, the policy management service is configured to monitor user requests to which the enforcement policy can be applied to determine whether users are engaged in anomalous behavior. For instance, if the enforcement policy is created to enable users to perform certain actions but these users begin to submit anomalous requests (e.g., requests that are suspicious or that other users would not typically submit), the policy management service may terminate the enforcement policy. Thus, while the enforcement policy may not specify a specific condition that may be used to determine whether the enforcement policy has expired, the policy management service may expire the enforcement policy based at least in part on evaluation of the application of the enforcement policy to incoming requests.

As noted above, an authorization module of a computing resource service may evaluate an incoming request against one or more computing resource policies to determine whether the request can be fulfilled. If the authorization module determines, based at least in part on the permissions specified or missing from the one or more computing resource policies, that the request cannot be fulfilled, the authorization module may obtain an enforcement policy that may specify a set of permissions. The authorization module may utilize this set of permissions to determine whether the request can be fulfilled. Accordingly, FIG. 4 shows an illustrative example of an environment 400 in which an enforcement policy 412 is applied to an existing policy 410 to determine one or more permissions applicable to an incoming request to access a computing resource service in accordance with at least one embodiment.

In the environment 400, a user 402 submits a request to a computing resource service 404 to perform one or more actions. In response to the request, the computing resource service 404 may transmit the request to a run-time service of the computing resource service provider to authenticate the request. If the run-time service is able to successfully authenticate the incoming request, the run-time service may query a policy database maintained by the policy management service to obtain one or more policies applicable to the incoming request. The run-time service may transmit these one or more policies to the authorization module 406 of the computing resource service 404. This may cause the authorization module 406 to evaluate the permissions specified in these one or more policies to determine whether the incoming request may be fulfilled.

Figure 4:
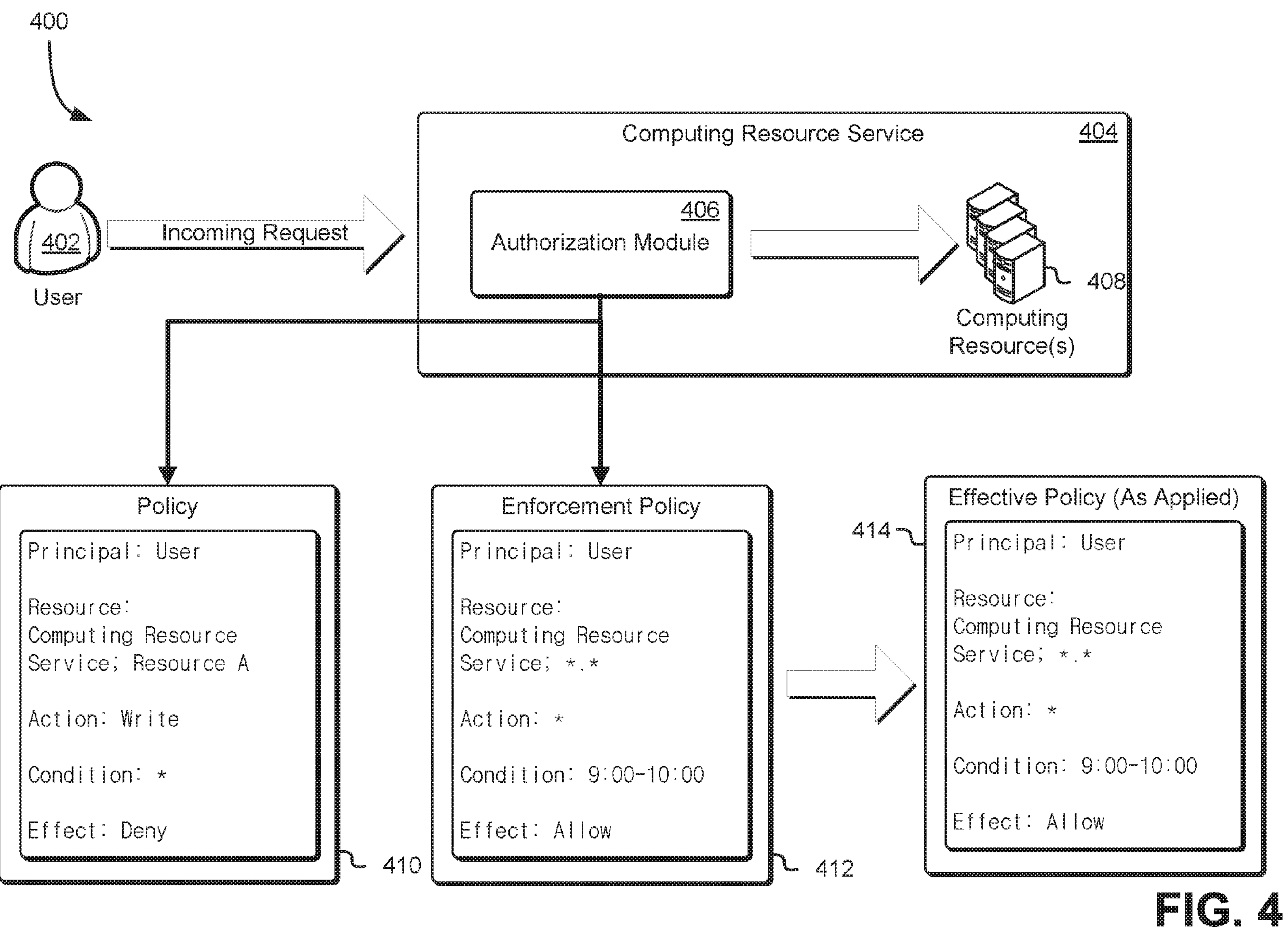
FIG. 4 shows an illustrative example of an environment in which an enforcement policy is applied to an existing policy to determine one or more permissions applicable to an incoming request to access a computing resource service in accordance with at least one embodiment.

As illustrated in FIG. 4, the authorization module may obtain, from the run-time service, policy 410, which is applicable to the incoming request. The authorization may evaluate the one or more permissions specified in policy 410 to determine whether the request can be fulfilled. For instance, policy 410 specifies that user 402 cannot perform write operations on Resource A, which may be one of the computing resources 408 provided by the computing resource service 404. If the user 402 has requested to perform a write operation on Resource A, the authorization module 406 may determine, based at least in part on the one or more permissions specified in policy 410, that the request should be denied.

If the authorization module 406 determines, based at least in part on the permissions specified in the policy 410, that the incoming request is to be denied, the authorization module 406 may transmit a request to the run-time service to determine whether there are any enforcement policies available that are applicable to the incoming request. As noted above, a customer of the computing resource service provider or other administrator of the customer's account may transmit a request to a policy management service to generate and implement an enforcement policy 412 for its resources for a specified period of time. The enforcement policy 412 may specify a set of permissions that may be more extensive than the permissions specified in the policy 410. For instance, as illustrated in FIG. 4, the enforcement policy 412 specifies a permission that, if applied to the user 402, would allow the user 402 to access any computing resource 408 provided by the computing resource service 404 and perform any action on these computing resources 408. This permission specified in the enforcement policy 412 provides a user 402 with greater flexibility than the permission specified in policy 410, whereby the user 402 would only be permitted to perform write operations on a specific computing resource (e.g., Resource A).

In some embodiments, the enforcement policy 412 specifies a time period during which the enforcement policy 412 is applicable to incoming requests. For instance, as illustrated in FIG. 4, the enforcement policy 412 specifies a condition whereby the permission specified in the enforcement policy 412 applies between 9:00 and 10:00. It should be noted that while conditional statements in the enforcement policy to denote the time period during which the enforcement policy is applicable are described extensively in the present disclosure, the time period may be defined using alternative methods. For instance, in response to a customer request to generate an enforcement policy, the policy management service may evaluate the request to identify a specified time period during which the enforcement policy is to be active. The policy management service may generate the enforcement policy and store the enforcement policy in a policy database. The policy management service may further update the policy database to denote that the enforcement policy is active during the specified time period. Thus, in response to a query from the run-time service to obtain any applicable enforcement policies, the policy database may evaluate these specified time periods to determine whether any enforcement policies are currently available that are applicable to the incoming request.

While time periods and similar temporal conditions are used extensively throughout the present disclosure for the purpose of illustration, an enforcement policy 412 may specify other conditions that are not temporal in nature but may otherwise limit the applicability of the enforcement policy. For instance, in addition to or in place of a temporal condition, the enforcement policy 412 may specify a condition whereby the enforcement policy 412 may only be applied for a specified number of incoming requests. Thus, the enforcement policy 412 may no longer be applicable to incoming requests if the enforcement policy 412 has been applied to the maximum number of requests, which may be specified in the enforcement policy 412.

The authorization module 406 may obtain, from the run-time service, an enforcement policy 412 that is applicable to the incoming request. The authorization module 406 may evaluate the enforcement policy 412 to determine whether the enforcement policy 412 has the needed permissions to enable the computing resource service 404 to fulfill the incoming request. For instance, the authorization module 406 may utilize the policy 410 and the enforcement policy 412 to determine the effective policy 414 that is applicable to the incoming request. The permissions specified in the enforcement policy 412 may supersede the permissions specified in the policy 410, as the enforcement policy 412 may specify a set of permissions that provide broader access to the computing resources 408 than the permissions specified in the policy 410. As illustrated in FIG. 4, the effective policy 414 is similar to the enforcement policy 412 as a result of the permission specified in the enforcement policy 412 providing the user 402 with greater access to the computing resources 408 than the more narrowly defined permission in the policy 410.

In an embodiment, if the enforcement policy 412 defines one or more permissions that would enable the computing resource service 404 to fulfill the request, the authorization module 406 transmits a notification to the service frontend indicating that the request can be fulfilled. In response to this notification, the service frontend may transmit executable instructions to the service backend to cause the incoming request to be fulfilled. However, if the authorization module 406 determines that, based at least in part on the permissions specified in the enforcement policy 412, that the request cannot be fulfilled, the authorization module 406 may transmit a notification to the service frontend indicating that the request cannot be fulfilled. This may cause the service frontend to transmit a notification to the user 402 indicating that the request has been denied.

The authorization module 406 may further generate a report indicating what permissions were either explicitly denied or were missing from the policy 410. Further, based at least in part on the permissions obtained from the enforcement policy 412 and utilized to process the incoming request, the authorization module 406 may generate one or more policy recommendations that, if followed, would enable the incoming request to be fulfilled without need for an enforcement policy. The authorization module 406 may transmit this report to the policy management service, which may make the report available to the customer or other administrators of the customer's account. Thus, a customer may transmit a request to the policy management service to obtain the report. The customer may further transmit a request to the policy management service to generate one or more policies based at least in part on the policy recommendations specified in the report or to modify any existing policies to the customer's preferences based at least in part on the information specified in the report.

Figure 5:
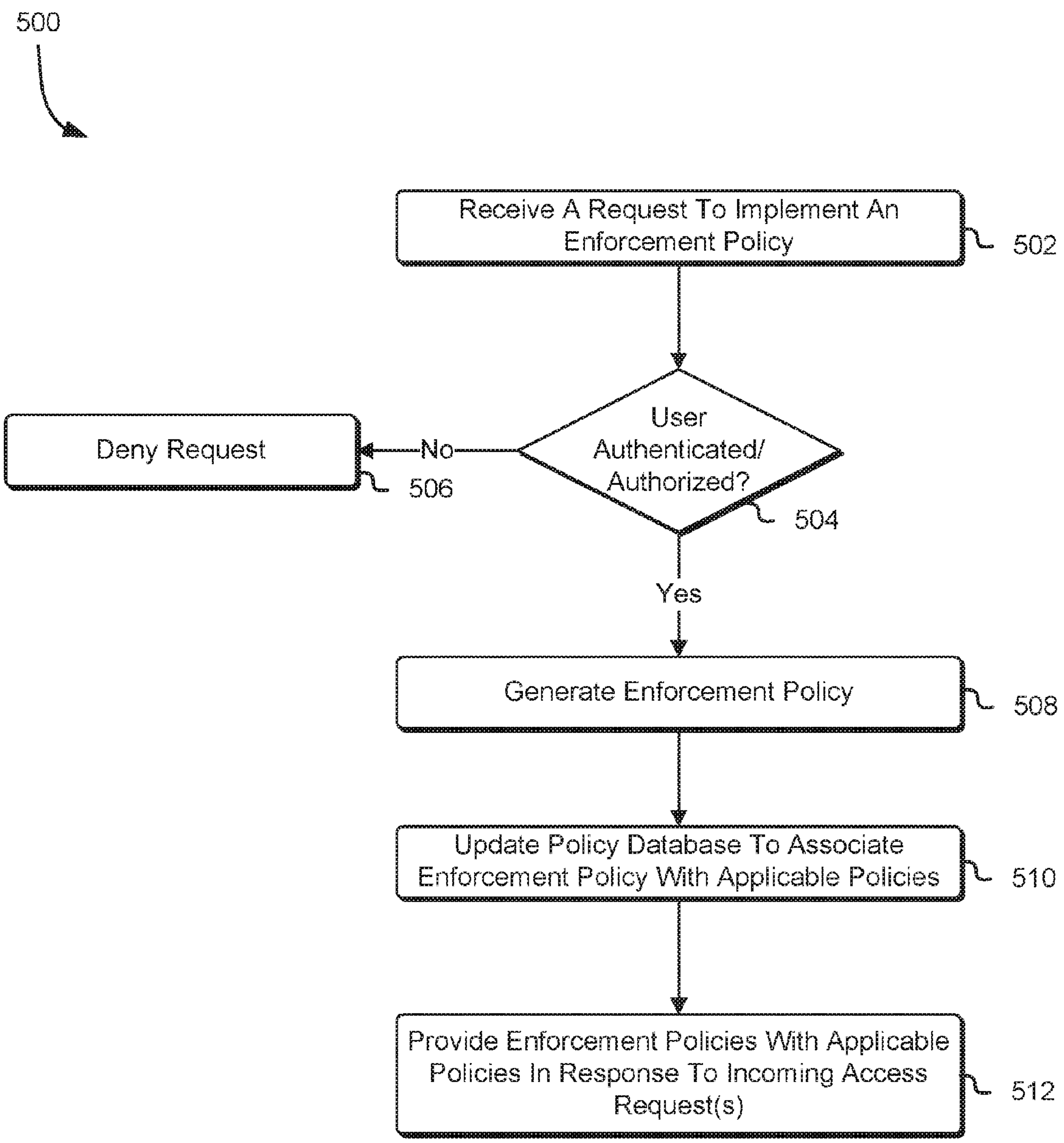
FIG. 5 shows an illustrative example of a process for implementing an enforcement policy to implement a set of permissions over a specified period of time in accordance with at least one embodiment.

As noted above, a customer or other administrator of the customer's account can submit a request to a policy management service to generate one or more enforcement policies for its resources and associated users. The one or more enforcement policies may define a set of permissions that may supersede existing permissions or otherwise supplement existing permissions to enable incoming requests to applicable computing resource services to be fulfilled during a specified period of time as defined by the customer or other administrator. Accordingly, FIG. 5 shows an illustrative example of a process 500 for implementing an enforcement policy to implement a set of permissions over a specified period of time in accordance with at least one embodiment. The process 500 may be performed by the aforementioned policy management service, which may process incoming requests from customers and administrators to implement enforcement policies. In some embodiments, the process 500 can be performed by a computing resource service, whereby the service may enable customers and administrators to generate an enforcement policy applicable to user requests to access resources provided by the computing resource service.

At any time, a customer of the computing resource service provider or other administrator of the customer's account may transmit a request to the policy management service to generate and implement one or more enforcement policies. The customer or other administrator may specify that users of computing resources associated with the customer's account may access these computing resources for a specified time period without any access limitations. Alternatively, the customer or other administrator may specify a set of permissions that are applicable to incoming requests to access these computing resources for the specified time period. Thus, the policy management service may receive 502 a request to implement an enforcement policy applicable to incoming requests to access one or more computing resources associated with the customer's account or otherwise applicable to users associated with the customer's account.

In response to receiving a request to implement an enforcement policy, the policy management service may determine 504 whether the user is authorized to implement an enforcement policy for its resources and users. For instance, the policy management service may obtain one or more policies from the policy database to determine whether the request to generate and implement an enforcement policy may be fulfilled. If, based at least in part on these one or more policies, the policy management service determines that the customer or other administrator is not authorized to generate and implement an enforcement policy, the policy management service may deny 506 the request. The policy management service may transmit a notification to the customer or other administrator to indicate that the request has been denied.

If the customer or other administrator is authorized to generate and implement an enforcement policy, the policy management service may identify, based at least in part on the parameters of the request, the permissions to be included in the enforcement policy. For instance, if the customer specifies that it would like to enable users to access its computing resources for a specified period of time without any access limitations, the policy management service may generate one or more permissions that specify that any users may access the customer's computing resources without any access limitations over the time period specified by the customer. The policy management service may use these newly generated permissions to generate 508 the enforcement policy that is to be implemented.

The policy management service may transmit the newly generated enforcement policy to the policy datastore to make the enforcement policy available for use. Further, the policy management service may update 510 the policy database to associate the enforcement policy with other applicable policies. For instance, the policy management service may update the policy database to specify the time period during which the enforcement policy is applicable for incoming requests. Further, the policy management service may update the policy database to associate the newly generated enforcement policy to users associated with the customer's account or otherwise specified by the customer and computing resources associated with the customer account.

The policy management service may monitor the policy database for incoming requests from a run-time service to obtain computing resource policies and enforcement policies for authorization purposes. If the policy management service receives, from a run-time service, a request to obtain one or more policies associated with an incoming request from a user of a computing resource service, the policy management service may provide 512 the enforcement policy and any other applicable policies to the run-time service in response to the incoming access request. In some embodiments, the policy management service provides the one or more computing resource policies associated with the incoming request to enable the authorization module of the computing resource service to determine whether the incoming request can be fulfilled. If the policy management service receives, from the run-time service, another request to obtain the enforcement policy, the policy management service may provide the enforcement policy to the run-time service, which may provide the enforcement policy to the authorization module for its use.

It should be noted that the process 500 may be performed using additional, fewer, or alternative operations. For instance, in an embodiment, the policy management service receives, from computing resource services, data usage logs that may specify user interactions with the various resources provided by these computing resource services. The data usage logs may further specify the computing resource policies that were applied to incoming user requests to access computing resources provided by these computing resource services. The policy management service may evaluate the data usage logs to determine whether to generate an enforcement policy applicable to incoming requests on behalf of an administrator of a customer account. For instance, if the policy management service determines, based at least in part on the received data usage logs, that users are submitting requests to access a particular resource provided by a service and these requests are being denied, the policy management service may generate an enforcement policy that may be used to enable these users to access the particular resource for a limited time.

In some embodiments, the policy management service evaluates the data usage logs to determine whether policies applied to requests from a new user in a working group result in different authorization decisions compared to the authorization decisions for the new user's peers in the working group. For instance, if the policy management service determines, based at least in part on the received data usage logs, that a new user in a working group is not being permitted access to resources to which other users in the working group have been granted access, the policy management service may generate an enforcement policy that may be applicable to the new user's requests to access these resources. Thus, if the new user submits a new request to access these resources, the computing resource service may apply the enforcement policy to the request and enable the new user to access the resources for a limited time. The policy management service may further generate one or more policy recommendations for the administrator of the service or of the working group specifying the permissions that may be applied to the new user to enable access to the resources. The administrator may generate or otherwise modify policies applicable to requests from the new user to enable the new user to have a similar level of access to resources as that of other users in the working group.

Figure 6:
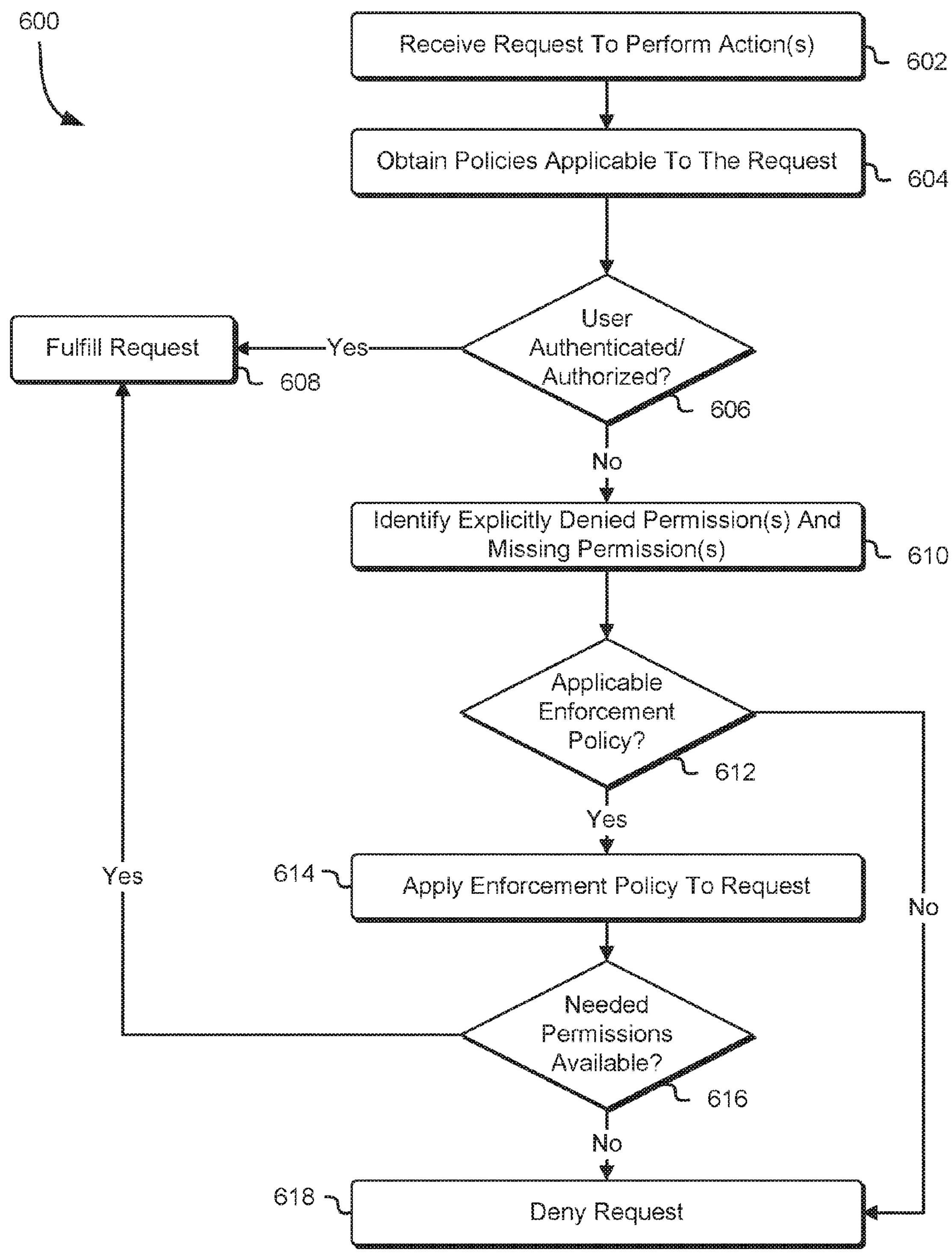
FIG. 6 shows an illustrative example of a process for applying an enforcement policy in addition to existing computing resource policies in response to an incoming request to perform one or more actions in accordance with at least one embodiment.

As noted above, a computing resource service may apply existing computing resource policies to incoming requests to determine whether these incoming requests can be fulfilled. If an incoming request cannot be fulfilled, the computing resource service may determine whether an enforcement policy is available in the policy database. The computing resource service may utilize the enforcement policy to determine whether the request can be fulfilled. Accordingly, FIG. 6 shows an illustrative example of a process 600 for applying an enforcement policy in addition to existing computing resource policies in response to an incoming request to perform one or more actions in accordance with at least one embodiment. The process 600 may be performed by any computing resource service comprising an authorization module that evaluates computing resource policies and enforcement policies to determine whether an incoming request may be fulfilled.

At any time, the computing resource service may receive 602 a request to perform one or more actions. A user may request access to one or more computing resources provided by the computing resource service and associated with a customer account. In response to the request, the computing resource service may provide the request to an authorization module of the service in order to obtain one or more computing resource policies that may be applicable to the incoming request. The authorization module may submit a request to a run-time service to obtain the one or more computing resource policies that are applicable to the incoming user request. In the request to the run-time service, the authorization module may provide the received user request. The run-time service may utilize the received user request to identify the parameters of a query to the policy datastore to obtain the necessary one or more computing resource policies. In response to the query, the policy database may obtain the one or more applicable computing resource policies and provide these policies to the run-time service. The run-time service may provide these computing resource policies to the authorization module, which may obtain 604 the policies applicable to the incoming user request.

The computing resource service may evaluate the obtained one or more computing resource policies to determine 606 whether the user is authorized to perform the requested actions. For instance, the service may check whether the fulfillment of the request for access to the service would comply with the obtained policies using the authorization module. The authorization module may compare the request to the one or more permissions in the obtained policies to determine whether the service may satisfy the request (i.e., whether fulfillment of the request is authorized). For example, the authorization module may compare an API call associated with the request against permitted API calls specified by the obtained policies to determine if the request is allowed.

If the authorization module determines, based at least in part on the one or more computing resource policies, that the request can be fulfilled, the computing resource service may fulfill 608 the received request. However, if the authorization module is unable to match the request to the permissions specified in the one or more computing resource policies, the authorization module may identify 610 any permissions explicitly denied by the one or more computing resource policies or missing permissions that resulted in the determination that the request cannot be fulfilled. In some embodiments, the authorization module further generates a report that specifies that the request, based at least in part on the obtained policies, would be denied. The authorization module may further generate and specify, in the report, one or more policy recommendations for permissions that may be used to enable fulfillment of the request. The authorization module may provide this report to the policy management service. In some instances, the computing resource service may provide the report to the user that submitted the request to perform the one or more actions. The user may evaluate the report and enable the user to request, to an administrator of a customer account or of the service, modification or creation of policies that may enable the user to perform the requested actions.

The computing resource policy, through the authorization module, may determine 612 whether there are any applicable enforcement policies available that may be used to determine whether the incoming user request can be fulfilled. The authorization module may transmit a request to the run-time service to obtain the one or more applicable enforcement policies. This may cause the run-time service to query the policy database to identify and obtain any applicable enforcement policies that may be used to determine whether the incoming user request can be fulfilled. For instance, the run-time service may utilize a timestamp of the incoming user request to determine whether the timestamp corresponds to an active time period for an enforcement policy that is applicable to the request. If the run-time service is unable to identify an applicable enforcement policy that can be used to determine whether the request can be fulfilled, the run-time service may notify the authorization module to indicate that no enforcement policies are available for the incoming user request. This may cause the authorization module and, hence, the computing resource service to deny 618 the user request.

If the run-time service obtains an applicable enforcement policy from the policy database, the run-time service may provide the applicable enforcement policy to the authorization module, which may apply 614 the enforcement policy to the user request. As noted above, the enforcement policy may specify one or more permissions that may supersede permissions specified in the other computing resource policies previously evaluated by the authorization module. The authorization module may evaluate the received enforcement policy to determine 616 whether the enforcement policy has the needed permissions available to enable the computing resource service to fulfill the request. For instance, the enforcement policy may specify a set of permissions that may enable the user to perform certain operations that, while more extensive than the permissions specified by the previously obtained one or more policies, may still provide limitations to the user's access to the computing resources provided by the computing resource service.

If the enforcement policy specifies the needed permissions to enable fulfillment of the request, the authorization module may cause a service frontend of the computing resource service to fulfill 608 the request. However, if the needed permissions are not specified in the enforcement policy, the authorization module may cause the service frontend of the computing resource service to deny 618 the request. If the request is fulfilled, the authorization module may generate a second report specifying the one or more permissions specified in the enforcement policy that were used to enable the request to be fulfilled. Further, the authorization module may prepare one or more policy recommendations based at least in part on the one or more permissions specified in the enforcement policy for creating a new policy that may be used for similar requests to the received user request. In some embodiments, the authorization module generates a single report that specifies both the policies that, if utilized, would result in the request being denied and the one or more permissions specified in the enforcement policy that were used to cause the request to be fulfilled.

Figure 7:
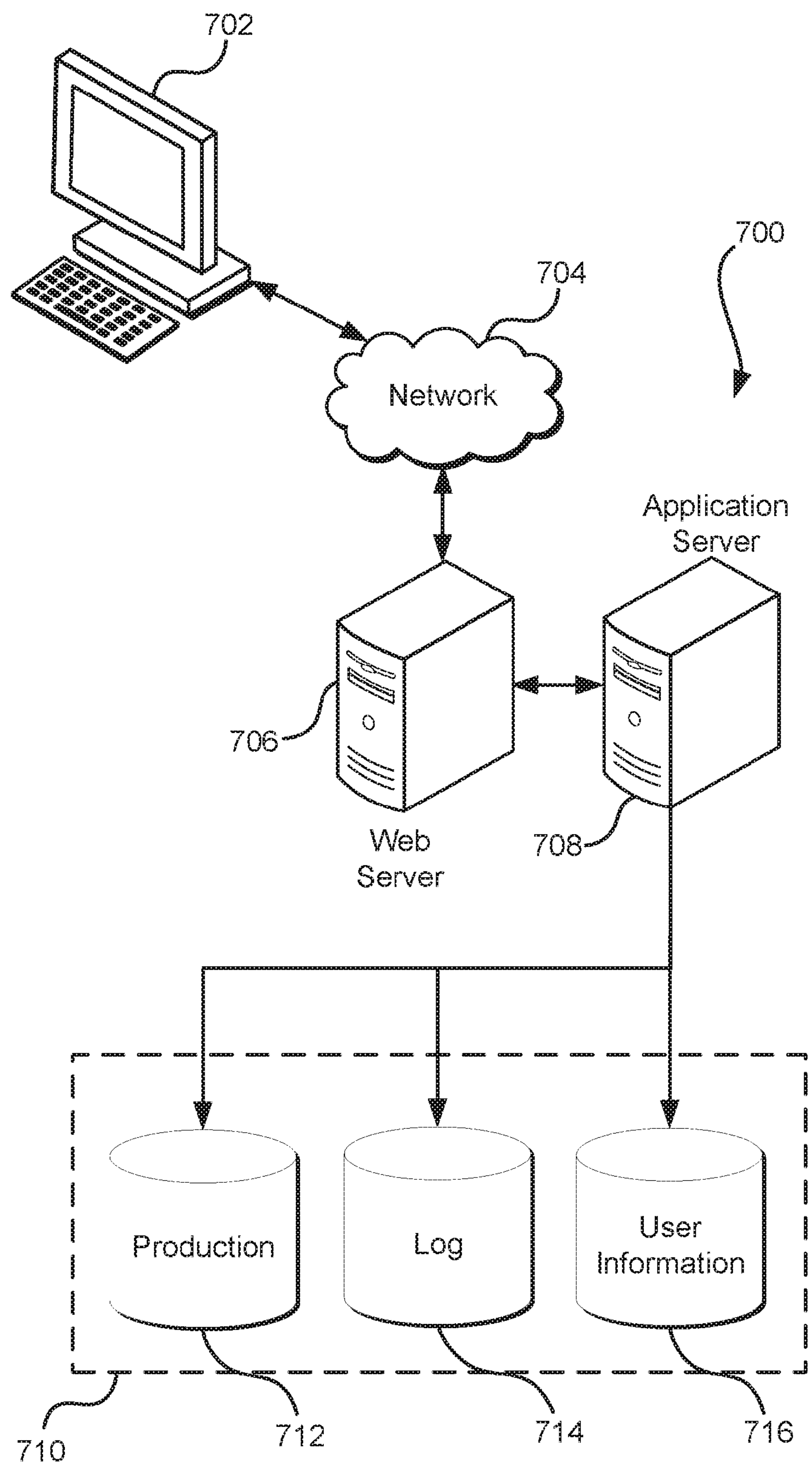
FIG. 7 shows an illustrative example of an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

under the control of one or more computer systems configured with executable instructions, receiving a request to perform one or more actions using at least one computing resource;

identifying, from a policy database, one or more computing resource policies applicable to the request, the one or more computing resource policies specifying a set of permissions usable to determine whether the request can be fulfilled;

determining, based at least in part on the set of permissions specified in the one or more computing resource policies, that the request cannot be fulfilled;

identifying, from the policy database, an enforcement policy applicable to the request, wherein:

the enforcement policy comprises a second set of permissions different from the set of permissions specified in the one or more computing resource policies; and the enforcement policy is generated based at least in part on evaluation of data usage logs for the computing resource, the data usage logs specifying a plurality of permissions applicable to requests to access the computing resource;

determining, based at least in part on the second set of permissions, that the request can be fulfilled;

fulfilling the request; and transmitting a notification indicating a set of explicitly denied permissions of the set of permissions and missing permissions from the set of permissions, the missing permissions included in the enforcement policy.

2. The computer-implemented method of claim 1, wherein:

the enforcement policy is active for a period of time; and the enforcement policy is applicable to the request if the request to perform the one or more actions is received during the period of time.

3. The computer-implemented method of claim 1, wherein the notification further specifies one or more policy recommendations for modifying the one or more computing resource policies to enable fulfillment of the request.

4. The computer-implemented method of claim 1, wherein the second set of permissions supersedes the set of permissions specified in the one or more computing resource policies.

5. A system, comprising:

one or more processors; and memory including instructions that, if executed by the one or more processors, cause the system to:

obtain one or more policies applicable to a request to access a computing resource;

as a result of a set of active policies failing to provide sufficient permissions for fulfillment of the request, determine that an enforcement policy is available that is applicable to the request, the enforcement policy generated based at least in part on evaluation of data usage logs for the computing resource;

evaluate the request using the enforcement policy such that if the enforcement policy includes permissions sufficient for fulfillment of the request, the request is fulfilled; and transmit a notification specifying the one or more policy recommendations, a set of explicitly denied permissions, and missing permissions, the missing permissions included in the enforcement policy.

6. The system of claim 5, wherein:

the data usage logs specify one or more authorization decisions in response to requests to access the computing resource; and the instructions further cause the system to generate, based at least in part on the permissions determined as a result of the evaluation of the data usage logs, the enforcement policy.

7. The system of claim 5, wherein the one or more policy recommendations specify one or more permissions that, if implemented through the set of active policies, would cause the request to be fulfilled.

8. The system of claim 5, wherein the permissions sufficient to enable fulfillment of the request supersede a set of permissions specified in the set of active policies.

9. The system of claim 5, wherein:

the enforcement policy specifies a maximum number of requests to which the enforcement policy can be applied; and the instructions further cause the system to determine that the enforcement policy is applicable to the request as a result of the maximum number of requests not being exceeded.

10. The system of claim 5, wherein the instructions further cause the system to:

receive a second request to access the computing resource;

obtain the one or more policies applicable to the request;

determine, based at least in part on the active set of policies, that the request can be fulfilled; and fulfill the request.

11. The system of claim 5, wherein the instructions further cause the system to submit a query to a policy database to obtain the one or more policies applicable to the request, the query specifying the request and parameters based at least in part on information in the request.

12. The system of claim 5, wherein the instructions further cause the system to:

receive a second request to implement the enforcement policy, the second request specifying one or more permissions applicable to the computing resource; and update a policy database to associate the enforcement policy with the one or more policies such that if a request to access the computing resource is not fulfilled based at least in part on the one or more policies, the enforcement policy is made available for use.

13. A non-transitory computer-readable storage medium having stored thereon executable instructions that, as a result of being executed by one or more processors of a computer system, cause the computer system to at least:

obtain a set of active policies applicable to a request to access a computing resource;

determine that the set of active policies fail to provide sufficient permissions for fulfillment of the request;

query a policy database to determine that an enforcement policy is available that is applicable to the request, the enforcement policy generated based at least in part on an evaluation of data usage logs for the computing resource;

fulfill the request if the enforcement policy includes permissions sufficient to enable fulfillment of the request; and transmit a notification specifying one or more policy recommendations, a set of explicitly denied permissions, and missing permissions, the missing permissions included in the enforcement policy.

14. The non-transitory computer-readable storage medium of claim 13, wherein the instructions further cause the computer system to:

receive a second request to access the computing resource;

obtain a second set of active policies applicable to the second request;

determine that the second set of active policies provide sufficient permissions for fulfillment of the second request; and fulfill the second request.

15. The non-transitory computer-readable storage medium of claim 13, wherein:

the data usage logs are generated based at least in part on previous access of the computing resource; and the instructions further cause the computer system to generate, based at least in part on the permissions determined as a result of the evaluation of the data usage logs, the enforcement policy.

16. The non-transitory computer-readable storage medium of claim 13, wherein the instructions further cause the computer system to:

receive a second request to generate the enforcement policy, the second request specifying one or more parameters usable to create the permissions necessary to enable fulfillment of the request; and update the policy database to associate the enforcement policy with the set of active policies.

17. The non-transitory computer-readable storage medium of claim 13, wherein the instructions further cause the computer system to:

evaluate the enforcement policy to determine whether the enforcement policy has expired; and determine that the enforcement policy is available as a result of the enforcement policy not being expired.

18. The non-transitory computer-readable storage medium of claim 13, wherein the permissions sufficient to enable fulfillment of the request supersede any conflicting permissions specified in the active set of policies.

19. The non-transitory computer-readable storage medium of claim 13, wherein the instructions further cause the computer system to:

receive a second request to access the computing resource;

determine that the set of active policies fail to provide sufficient permissions for fulfillment of the second request;

obtain the enforcement policy;

determine that the enforcement policy does not include permissions sufficient to enable fulfillment of the second request; and deny the second request.

20. The non-transitory computer-readable storage medium of claim 13 wherein the report further specifies one or more permissions that, if implemented through the set of policies, would cause the request to be fulfilled.

* * * * *